Jan. 27, 1970   E. A. ELLIOTT ET AL   3,491,502
LAMINATED LINE RISER
Filed Feb. 6, 1967   2 Sheets-Sheet 1
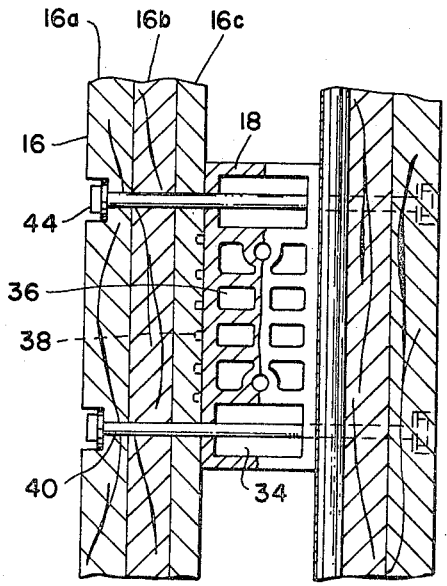
FIG. 4
FIG. 3
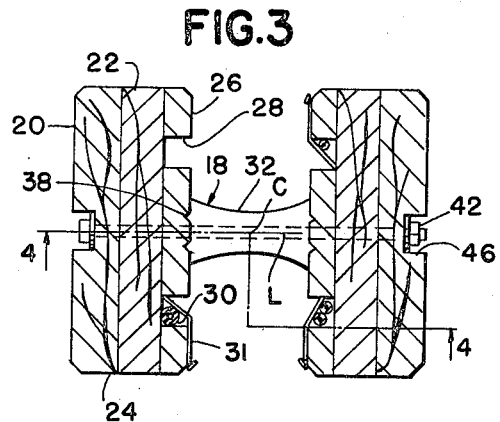
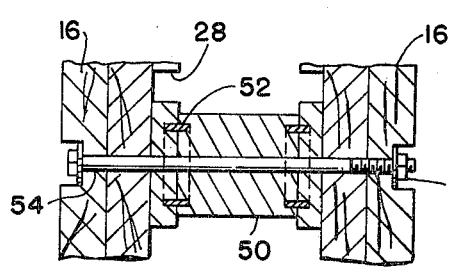
FIG. 5
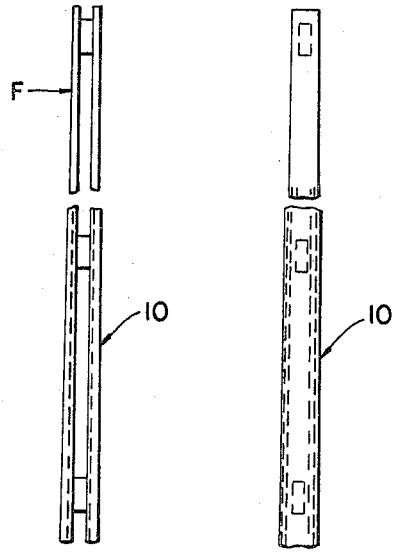
FIG. 2
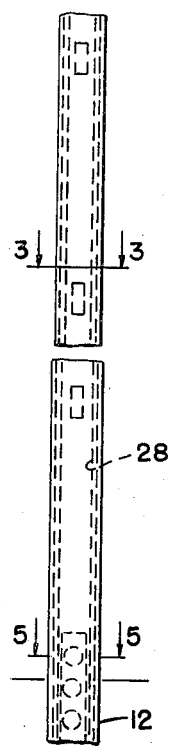
FIG. 1
*INVENTOR.S*
ERNEST A. ELLIOTT
JOHN W. KANE
BY
ATTORNEYS Jan. 27, 1970   E. A. ELLIOTT ET AL   3,491,502
LAMINATED LINE RISER Filed Feb. 6, 1967                    2 Sheets-Sheet 2

INVENTORS
ERNEST A. ELLIOTT
JOHN W. KANE

BY Whittemore, Hulbert
& Belknap —ATTORNEY

United States Patent Office 3,491,502
Patented Jan. 27, 1970

3,491,502
LAMINATED LINE RISER
Ernest A. Elliott, Detroit, and John W. Kane, Pontiac, Mich., assignors to The Detroit Edison Company, Detroit, Mich., a corporation of New York
Filed Feb. 6, 1967, Ser. No. 614,223
Int. Cl. E04h *12/04*
U.S. Cl. 52—690         11 Claims

ABSTRACT OF THE DISCLOSURE

A line riser formed of two or more flat tapered elongated wood members extending in substantial parallelism and interconnected at relatively widely spaced points by spacing elements, the confronting faces of at least one of said members having a groove formed therein for the reception of a wire or the like.

CROSS-REFERENCE TO RELATED APPLICATION

This application is directed to a laminated line riser, the appearance of one form of which is portrayed in a copending design application, Ser. No. D5529, filed Jan. 23, 1967.

BACKGROUND OF THE INVENTION

The invention relates to line risers which may be used for supporting electrical or telephone wires, lighting fixtures, or the like. Fundamentally, the poles have to be straight, uniform in shape and aesthetic while accommodating overhead distribution, street lighting and underground feeds to URD transformers. Under present concepts, ornamental poles have generally been square or round, tapered tubes made of steel, aluminum or concrete. Although these designs and materials offer the basic criteria for ornamental poles they fall short of providing the desired total flexibility of wood pole construction.

SUMMARY OF THE INVENTION

Line risers in accordance with the present invention are produced in the form of doubly tapered wooden elements formed from two or more elongated laminated wooden bodies by planing to produce taper in one direction and by sawing to the required taper in the other transverse direction. These wooden elements are assembled together with flat sides parallel to or generally confronting each other and spaced by transversely extending metal spacers.

The construction represents an improvement over poles which have previously been used in that it is formed of material which eliminates scrap or wastage resulting from turning timbers to a required cross-sectional dimension. Furthermore, these line risers represent an improvement over prior usage in that the relatively thin laminations may be pre-treated more efficiently with preservative so as to contribute to a longer useful life. In addition, the line risers provide for an improved arrangement in which the electrical conductors required to extend from the ground to structure carried at the top of the line riser are effectively concealed in the space between the line riser components, and more particularly are received in one or more vertically extending grooves provided in one or more of the confronting faces of the riser components.

Details and features of the invention will become apparent as the description proceeds, especially when taken in conjunction with the accompanying drawings, illustrating preferred embodiments of the invention.

BRIEF DESCRIPTION OF THE DRAWINGS

FIGURE 1 is a side elevation of the completed line riser.

FIGURE 2 is a side elevation, similar to FIGURE 1, except that it is taken at 90 degrees thereto.

FIGURE 3 is an enlarged sectional view on the line 3—3, FIGURE 1.

FIGURE 4 is a fragmentary sectional view on the line 4—4, FIGURE 3.

FIGURE 5 is a fragmentary sectional view on the line 5—5, FIGURE 1.

DESCRIPTION OF THE PREFERRED EMBODIMENTS

Figure 6:
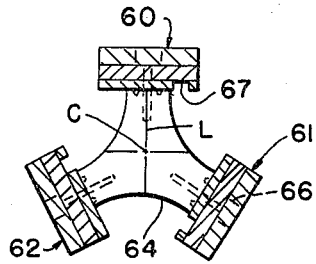
FIGURES 6 and 7 are fragmentary sectional views representing different embodiments of the invention.

Referring now to FIGURES 1–5, a line riser 10 is illustrated as having its lower portion 12 set into the ground, the ground level being indicated at 14. The line risers are formed essentially of wood; specifically, each one is formed of two tapered elongated components indicated at 16, each component being tapered as to width and thickness. The components are assembled together by a plurality of substantially uniformly spaced metal spacers 18 so as to provide elongated openings 20 of uniform width intermediate the riser components 16 and intermediate the spacers 18.

In producing the riser components 16 the preferred procedure is to initially form elongated blocks by laminating together boards or planks of suitable dimensions. By way of specific example, line risers having a full length of approximately 40 feet, intended to have the lower 6 feet thereof set into the ground, have been produced by laminating together five boards or planks having a nominal cross-sectional dimension of 2 x 12. As is well understood, the actual dimensions of the dimensioned lumber is approximately 1⅝–1⅞ inches in thickness, and somewhat less than 12 inches in width.

Prior to lamination the individual planks or boards are treated with a suitable preservative to give them the requisite aging properties, the preservative of course being selected such as to be compatible with the adhesive which is used in laminating of the individual boards together. A suitable preservative for this purpose, by way of example, is penta-chloro-phenol, which is identified by the trademark CELLON of the Koppers Company, Inc. With this preservative an adhesive compatible therewith is the adhesive described in Military Specification MIL–A–397–B.

By treating the individual planks or boards prior to lamination, it is of course possible to effect a more thorough and complete treatment than would be possible by attempting to treat the product after lamination. Moreover, by assembling the bodies from individual planks or boards, it is of course possible to use material which would not be capable of forming into poles. In this connection it may be mentioned that it is perfectly possible to produce satisfactory laminated bodies for the purpose disclosed herein by using planks or boards having a length less than the required total of 40 feet, by proper splicing of the abutting ends of the shorter pieces.

Referring to FIGURE 4 for example, it will be observed that one of the riser components 16 is formed of laminations identified as 16*a*, 16*b*, and 16*c*. In producing the riser components 16 from the laminated body the body is sawed longitudinally, the saw cut being taken on a diagonal to produce two pieces having substantially the required taper in one dimension. After sawing, the other faces (that is, the outer face 20 and the edge faces 22 and 24 as seen in FIGURE 3) are planed to produce the required taper as well as to produce a desirable planed finish. The sawed face designated 26 in FIGURE 3, need not be planed since this surface is substantially concealed in the completed assembly.

After sawing the laminated body into two parts, elongated grooves or channels 28 are formed therein which extend from adjacent but spaced from the top to a point adjacent but spaced from the bottom thereof. These channels are for the purpose of receiving wires or conductors indicated generally at 30 in FIGURE 3. It is therefore unnecessary for the channels to extend to the bottom of the line riser and they are continued to a point adjacent the top at which it is desirable for the wires or conductors to emerge from the channels to be led to the appropriate devices supported at the top of the line risers. The wires or conductors 30 are further concealed and protected by metal strips 31 which extend upwardly from approximate ground level to a height as required by safety codes, and thereabove the continuous strip may be replaced by narrow clips for retaining the wires or conductors within the channels 28.

To produce the completed line riser shown in elevation in FIGURES 1 and 2, two of the riser components 16 are assembled together with the metal spacers 18 interconnected therebetween. These spacers, as seen in FIGURES 3 and 4, are vertically elongated and the sides thereof are concave as indicated at 32. In addition, the spacers are cored to provide openings indicated generally at 34 and 36. The edges of the spacers 18 are provided with pointed projections 38 which are embedded in the inner surfaces of the riser components 16. The assembly is completed by through bolts 40 associated with nuts 42, the heads 44 of the bolts and the nuts 42 being received in recesses 46 provided in the outer surfaces of the riser components 16.

Adjacent the bottom of the line risers and extending upwardly intermediate the riser components 16 for approximately 7 feet is a wood spacer strip 50. The strip is dimensioned to extend somewhat above the ground level 14 as indicated in FIGURES 1 and 2. In addition, the width of the strip, measured in a direction between the riser components 16 is the same as the effective width of the spacers, and in a typical example, may be 3 inches. The other transverse dimension of the strip, as best illustrated in FIGURE 5, is such that the opposite sides thereof are spaced inwardly from the grooves or channels 28.

The line risers 10, being formed essentially of two transversely elongated strips, exhibit considerable strength in a direction parallel to the transverse width of the riser components as contrasted with the thickness thereof. In order to provide maximum strength of the line riser and particularly at the point of greatest loading; namely, adjacent the lower end thereof, means are provided to interconnect the wooden spacer strip with particular attention to preventing sliding movement between the adjacent surfaces of the strip 50 and the confronting or abutting surfaces of the riser components 16. For this purpose metal rings 52 are provided which are partially embedded into the confronting faces of the riser components 16 and the wood spacer strip 50. The rings 52 may be continuous or split as desired and serve to provide a firm interlock preventing relative sliding between the abutting surfaces as aforesaid. The construction is completed by a plurality of assembly bolts 54 and nuts 56 similar in all respects to the bolts 40 previously described. The bolts 54 extend through openings provided in the riser components 16 and similar openings provided in the spacer strips 50. When the nuts 56 are tightened to insure rigidity of the assembly, as illustrated in FIGURE 5, it will be apparent that the rings 52 are effective for the purpose of preventing relative sliding between the parts as previously described.

It is recognized that the strength of the line riser in opposing forces applied in the direction across the space between the riser components (such direction being indicated by the arrow F) is dependent to a large degree upon the spacing between the riser components. In a particular case the strength of the line riser was increased by a factor of more than two by increasing the spacing between the riser components from 3 inches to 9 inches. When the spacing between the line riser components is approximately 3 inches in the line riser dimension substantially as disclosed previously, the riser exhibits substantially equal strength against horizontal forces applied in the direction of the arrow F or horizontal forces applied at 90 degrees thereto. This becomes a matter of considerable importance where it is desirable to provide a corner or end line riser and at the same time to avoid guy wires, braces, or the like. In this case a line riser which is to constitute a corner or the end of a line of line risers may have the spacing between its riser components increased to provide the required strength and will be placed in position such that this increased strength is available to oppose the increased loading due to the location of the line riser. In this case it may of course be desirable to somewhat increase the length of the line riser so as to permit setting it more deeply into the ground.

In the foregoing description attention has been directed particularly to a line riser comprising two riser components of rectangular cross-section disposed in parallel spaced relation with their wider side surfaces in confronting relation.

Figure 7:
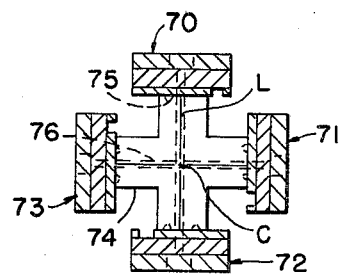

Referring now to FIGURES 6 and 7 there are illustrated two modifications of the embodiment of the invention as previously described.

In FIGURE 6 the line riser is illustrated as comprising three riser components designated 60, 61 and 62. Each of these riser components may be identical with one of the riser components 16 as previously described; that is, they are formed from laminated wood and are provided with a substantially uniform taper from one end to the other. The riser components 60, 61 and 62 are interconnected by a plurality of spacers 64 which may be of metal and have a substantial vertical dimension similar to the vertical dimension of the spacers 18. They also are preferably provided with teeth or projections as indicated at 65, which may be in all respects identical to the projections 38 previously described. In this case however, it is impractical to interconnect the riser components by through bolts as in the embodiment previously described, and instead the riser components are attached to the spacers 64 by bolts 66, only one of which is illustrated in FIGURE 6.

To provide the grooves or channels for receiving, concealing and protecting the wires or conductors leading to the top of the line risers, one or more of the riser components are provided with the groove or channel 67 on its inner face.

It will be apparent that the line riser illustrated in FIGURE 6 has considerable similarity to the line riser illustrated in FIGURES 1–5 but will exhibit considerably more strength due to the use of an additional riser component and due in addition to the equal angular arrangement of the line risers about a common center. As in the two-component embodiment previously described, the strength of the line riser applicable to overcome lateral loading is in part a function of the spacing of the individual riser components from the common center and here, as in the previously described embodiment, it may be desirable to provide special line risers for use at corners or at the ends of lines having increased spacing and ordinarily increased length to permit use of the line riser without guy wires, braces, or the like.

Referring now to FIGURE 7 there is illustrated a further embodiment of the invention in which four riser components, designated 70, 71, 72 and 73 are employed. In this case the riser components are spaced apart but rigidly interconnected by spacers 74 in the form of a cross. As in the previously described embodiments, the spacers 74 are preferably formed of metal and are provided with teeth or projections as indicated at 75 adapted to penetrate the wooden riser components. In this embodiment of the invention it is again possible to provide assembly by the use of through bolts 76 similar in all respects to the bolts 40 employed in the embodiment of the invention illustrated in FIGURES 1-5.

From the foregoing it will be apparent that in all cases the line risers are formed from a plurality of riser components each of which is elongated, doubly tapered, substantially straight wooden members of rectangular cross-section. It will further be apparent that in all cases the riser components are assembled together in substantially parallel laterally spaced relationship with one of the wider sides at the inner side of the assembly, and specifically, one of the wider sides of each of the riser components is disposed perpendicular to a line drawn radially from the vertical center line of the line riser. The vertical center lines in the several figures is designated C and a line extending radially from the center line and perpendicular to the inner face of the riser components is designated L.

The line riser as described in the foregoing not only represents most efficient use of available materials to produce line risers having properties superior to solid poles of circular cross-section, but also provide line risers having a particularly attractive appearance due to the "see through" feature provided by the lateral spacing between the vertical line riser components 16. For this purpose it is desirable to provide a vertical distance between the spacers 18 which is at least several times the vertical dimension of the individual spacers. For example, the spacers in a preferred embodiment of the present invention have a vertical dimension of about 9 inches and the vertical distance between centers of adjacent spacers is approximately 5 feet. This provides vertically elongated windows of uniform width. Furthermore, the arrangement provides for effecting concealment and protection of electrical conductors. Finally, the construction provides for line risers which are most efficiently protected to give them superior aging qualities, since the treatment may be applied to the relatively thin board components before lamination.

The drawing and the foregoing specification constitute a description of the improved laminated line riser in such full, clear, concise and exact terms as to enable any person skilled in the art to practice the invention.

What we claim as our invention is:

1. A line riser comprising a pair of elongated, doubly tapered, substantially straight wooden riser components assembled together in substantially parallel, uniformly laterally spaced relation, the confronting surfaces of said components being flat vertical surfaces parallel to each other, said components in cross-section having a transverse dimension perpendicular to said flat surfaces substantially less than the transverse dimension parallel to said surfaces, and equally dimensioned spacers rigidly interconnecting said components, and vertically spaced from each other a distance several times the vertical dimension of each spacer, the space between the confronting surfaces of said components being free of obstruction except for said spacers to provide a plurality of vertical elongated windows of uniform width each delimited by the confronting surfaces of said riser components and the ends of adjacent spacers.

2. A line riser as defined in claim 1 in which said riser components are of rectangular transverse cross-section.

3. A line riser as defined in claim 2 in which each riser component is formed of laminations having the major cross-sectional dimension thereof parallel to the wider sides of the riser component.

4. A line riser as defined in claim 3 in which each lamination extends the full width of the line riser.

5. A line riser as defined in claim 1 in which the inner face of one or more of said components is provided with one or more vertical grooves or channels for the reception and concealment of wiring.

6. A line riser as defined in claim 5 in which each of said grooves or channels is provided adjacet an edge of the face of the riser component in which it is provided, and said spacers are spaced inwardly from the edges of said faces to clear said groove or channel.

7. A line riser as defined in claim 6 in which said spacers are of metal and the sides of said spacers engaging the confronting surfaces of said riser components are provided with pointed projections embedded in the confronting riser component surfaces.

8. A line riser as defined in claim 2 in which the lower ends of said riser components, for a distance exceeding the depth in which the riser is to be set in the ground, are connected by a continuous elongated wood spacer strip.

9. A line riser as defined in claim 2 in which the riser is formed from two riser components.

10. A line riser as defined in claim 2 in which the riser comprises three riser components spaced symmetrically around a vertical center line.

11. A line riser as defined in claim 2 in which the riser comprises four riser components spaced symmetrically around a vertical center line.

References Cited

UNITED STATES PATENTS

| | | | |
|---|---|---|---|
| 233,871 | 11/1880 | Orwig | 52—721 |
| 1,696,773 | 12/1928 | Malone | 52—721 X |
| 1,795,716 | 3/1931 | Eckland | 52—727 |
| 2,060,080 | 11/1936 | Horner | 52—726 X |
| 2,159,955 | 5/1939 | Scales | 52—730 X |
| 2,824,342 | 2/1958 | Hoyle | 52—731 X |
| 2,834,073 | 5/1958 | Hoyle | 52—731 |

FOREIGN PATENTS

| | | |
|---|---|---|
| 547,576 | 11/1926 | Germany. |
| 1,032,439 | 7/1953 | France. |

ROY D. FRAZIER, Primary Examiner

J. F. FOSS, Assistant Examiner

U.S. Cl. X.R.

52—731